United States Patent
Nishimoto

[11] 3,951,523
[45] Apr. 20, 1976

[54] PHOTOGRAPHIC LENS SYSTEM WITH A SHORT OVERALL LENGTH

[75] Inventor: Yoshio Nishimoto, Hamura, Japan

[73] Assignee: Olympus Optical Co., Ltd., Tokyo, Japan

[22] Filed: Dec. 4, 1974

[21] Appl. No.: 529,590

[30] Foreign Application Priority Data
Dec. 5, 1973  Japan............................ 48-135245

[52] U.S. Cl................................. 350/189; 350/176; 350/225
[51] Int. Cl.² ...................... G02B 3/04; G02B 9/12
[58] Field of Search..................... 350/225, 189, 176

[56] References Cited
UNITED STATES PATENTS
1,616,765  2/1927  Sonnefeld ............................ 350/189

FOREIGN PATENTS OR APPLICATIONS
319,997  4/1957  Switzerland ......................... 350/225
1,097,708  1/1961  Germany .............................. 350/225

Primary Examiner—Paul A. Sacher
Attorney, Agent, or Firm—Cushman, Darby & Cushman

[57] ABSTRACT

A photographic lens system with a short overall length comprising three lens components of four lenses from a first through third lens components, at least the surface on the image side of said third lens component being an aspherical surface expressed by the following formula $$x = \frac{y^2}{r_7 + r_7 \sqrt{1 - \left(\frac{y}{r_7}\right)^2}} + By^4 + Cy^6 + Dy^8 + Ey^{10} \quad (1)$$

$$B > 0, C < 0 \quad (2)$$

3 Claims, 9 Drawing Figures

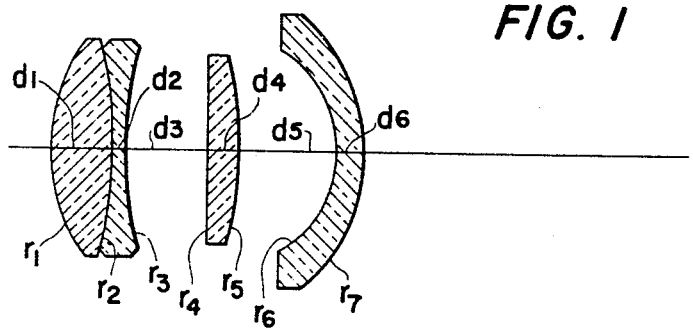
FIG. 1
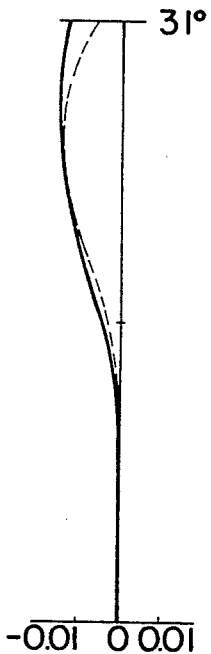
FIG. 2A
SPHERICAL ABERRATION, SINE CONDITION
FIG. 2B
ASTIGMATISM
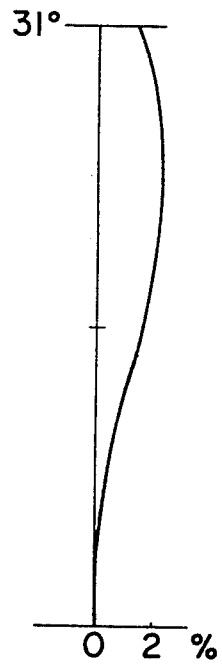
FIG. 2C
DISTORTION
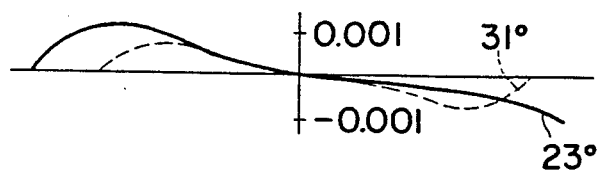
FIG. 2D
COMA

FIG. 3A

SPHERICAL ABERRATION, SINE CONDITION

ASTIGMATISM

DISTORTION

COMA

31°
+0.001
-0.001
23°

PHOTOGRAPHIC LENS SYSTEM WITH A SHORT OVERALL LENGTH

BACKGROUND OF THE INVENTION

1. Field of the Invention:

The present invention relates to a photographic lens system and, more particularly, to a photographic lens system comprising three lens components of four lenses and having a short overall length.

2. Description of the Prior Art:

In these days, there is an increasing demand for making the overall construction of cameras compact. To meet this demand, it is necessary to make the overall length of the lens system, i.e., the distance from the lens surface nearest the object of the lens system to the image surface as short as possible. When designing a lens system comprising four lenses for which an aperture ratio is 1:56 or more and overall length of the lens system is within 0.9 time of its focal length, it is generally arranged to use a negative meniscus lens on the image side of the lens system. When, however, a negative meniscus lens is arranged on the image side of the lens system as above, large distortion will be caused. If the lens system is designed to limit this distortion to a desired small value, it becomes impossible to correct coma.

SUMMARY OF THE INVENTION

It is, therefore, a primary object of the present invention to provide a compact photographic lens system comprising a small number of lenses for which aberrations including distortion are favourably corrected by arranging an aspherical lens on the image side.

The photographic lens system according to the present invention comprises three lens components of four lenses in which a first lens component is a cemented positive meniscus lens component arranged by cementing a biconvex lens and biconcave lens, a second lens component is a positive lens, and a third lens component is a negative meniscus lens with its concave surface positioned on the objective side and in which said third lens component is an aspherical lens, at least its surface on the image side being an aspherical surface. Besides, the surface on the image side of said third lens component is a surface expressed by the following formulas when reference symbol $r_7$ represents the radius of curvature of said surface near the optical axis, the advancing direction of ray on the optical axis is represented by $x$ axis, and the direction perpendicular to said $x$ axis is represented by $y$ axis.

$$x = \frac{y^2}{r_7 + r_7\sqrt{1-\left(\frac{y}{r_7}\right)^2}} + By^4 + Cy^6 + Dy^8 + Ey^{10} \quad (1)$$

$$B > 0, c < 0 \quad (2)$$

Moreover, the lens system according to the present invention satisfies the following condition when reference symbol $f$ represents the focal length of the lens system as a whole and reference symbol $f_4$ represents the focal length of the third lens component.

$$0.5f < -f_4 < 1.2f \quad (3)$$

By arranging the lens system as mentioned in the above and, moreover, by using an aspherical lens as the third lens component and arranging the surface on the image side of said third lens component as an aspherical surface expressed by formulas (1) and (2), it is possible to correct distortion of the lens system to a desired small value. Besides, by arranging the first lens component as a cemented lens component consisting of a biconvex lens and a biconcave lens, it is also possible to favourably correct coma.

Moreover when the focal length $f_4$ of the third lens component is selected in the range smaller than the upper limit of the condition (3), it is possible to achieve the effect to make the overall length of the lens system short. When $f_4$ is selected as far as possible as a small value within said range, it will be more effective to shorten the overall length. It is, however, not preferable to make $f_4$ too small because other aberrations will be aggravated. If $f_4$ becomes smaller than the lower limit of the condition (3), it becomes difficult to correct coma by limiting distortion to a desired small value even when an aspherical lens is used. Besides, $f_4$ smaller than the lower limit of the condition (3) is not desirable also for correction of other aberrations such as spherical aberration, curvature of the field, etc. and it will become impossible to obtain a favourable image over the whole field.

BRIEF DESCRIPTION OF THE DRAWINGS

FIG. 1 shows a sectional view of the photographic lens system according to the present invention;

FIGS. 2A, 2B, 2C and 2D respectively show graphs illustrating aberration curves of the Embodiment 1 of the photographic lens system according to the present invention; and FIGS. 3A, 3B, 3C and 3D respectively show graphs illustrating aberration curves of the Embodiment 2 of the photographic lens system according to the present invention.

DETAILED DESCRIPTION OF THE PREFERRED EMBODIMENTS

Preferred embodiments of the photographic lens system according to the present invention explained in the above are as shown below.

Embodiment 1

$f = 1$, $f_4 = -0.689$
Aperture ratio 1 : 5.6
Field angle ± 31°
Overall length 0.886

$r_1 = 0.2008$
  $d_1 = 0.076$  $n_1 = 1.58267$  $v_1 = 46.3$
$r_2 = -0.5814$
  $d_2 = 0.017$  $n_2 = 1.83630$  $v_2 = 30.4$
$r_3 = 0.4384$
  $d_3 = 0.097$
$r_4 = 2.7475$
  $d_4 = 0.038$  $n_3 = 1.6668$  $v_3 = 33.0$
$r_5 = -0.6844$
  $d_5 = 0.123$
$r_6 = -0.1366$
  $d_6 = 0.029$  $n_4 = 1.60311$  $v_4 = 60.7$
$r_7$ Aspherical surface Embodiment 2

$f = 1$, $f_4 = -0.769$
Aperture ratio 1 : 4.5
Field angle ± 31°
Overall length 0.899

$r_1 = 0.2121$
  $d_1 = 0.096$  $n_1 = 1.58913$  $v_1 = 61.1$
$r_2 = -0.5893$
  $d_2 = 0.018$  $n_2 = 1.83400$  $v_2 = 37.2$
$r_3 = 0.4568$
  $d_3 = 0.089$
$r_4 = 3.0754$
  $d_4 = 0.039$  $n_3 = 1.66446$  $v_3 = 35.8$
$r_5 = -0.7237$

-continued $d_5 = 0.116$
$r_6$ Aspherical surface
$\quad d_6 = 0.045 \quad n_4 = 1.491 \quad \nu_4 = 61.4$
$r_7$ Aspherical surface In the above, reference symbols $r_1$ through $r_7$ respectively represent radii of curvature of respective lens surfaces, reference symbols $d_1$ through $d_6$ respectively represent thicknesses of respective lenses and airspaces between respective lenses, reference symbols $n_1$ through $n_4$ respectively represent refractive indexes of respective lenses, and reference symbols $\nu_1$ through $\nu_4$ respectively represent Abbe's numbers of respective lenses.

Out of the above embodiments, the Embodiment 1 is arranged as follows. That is, the convex surface $r_7$ of the third lens component, i.e., its surface on the image side is arranged as an aspherical surface having the radius of curvature of its portion near the optical axis selected as $-0.2199$. Besides, numerical values for reference symbols in the aforementioned formulas are selected as $B = 3.489$, $C = -1.056 \times 10^3$, $D = 4.635 \times 10^4$, and $E = -1.147 \times 10^6$.

The Embodiment 2 is arranged as follows. That is, both surfaces of the third lens component are arranged as aspherical surfaces. Out of them, the surface $r_6$ on the object side has a radius of curvature at its portion near the optical axis selected as $-0.1380$ and numerical values selected as $B = -2.213 \times 10 \times 1$, $C = -3.821 \times 10$, $D = 2.381 \times 10^4$, and $E = -3.017 \times 10^6$. The surface $r_7$ on the image side has a radius of curvature at its portion near the optical axis selected as $-0.2408$ and numerical values selected as $B = 2.869$, $C = -7.279 \times 10^2$, $D = 2.482 \times 10^4$, and $E = -6.324 \times 10^5$.

Graphs illustrating aberration curves of the above-mentioned two embodiments are respectively shown in FIGS. 2A, 2B, 2C and 2D and FIGS. 3A, 3B, 3C and 3D. As is evident from the above embodiments and their aberration curves, the photographic lens system according to the present invention provides a favourable image over the whole field though it comprises only four lenses and has a short overall length which does not exceed 0.9 time of the focal length.

As it is comparatively difficult to manufacture aspherical lenses using glass as material because the manufacturing process is complicated, it is practically desirable to make the number of portions to introduce aspherical surfaces as small as possible. From this point of view, it is more preferable to limit the number of aspherical surface to only one surface as in the case of Embodiment 1. Lately, however, it became possible to manufacture lenses of good quality by using plastics as material and such plastic lenses are now used in various fields. In manufacture of aspherical lenses made of plastics, only difficulty is to make a molds having aspherical surfaces. Therefore, in case of mass production, efficiency in manufacture of plastic lenses is remarkably higher compared with manufacture of aspherical lenses made of glass. Besides, it is also known to manufacture an aspherical lens by coating the surface of a spherical lens with a thin plastic film so that the surface of said plastic film will become an aspherical surface. When plastics are used as described in the above, it becomes possible to make both surfaces of a lens aspherical surfaces more easily in actual production. The embodiment 2 is arranged to correct coma more favourably by adopting aspherical surfaces for both surfaces of the third lens component taking the above into consideration.

I claim:

1. A photographic lens system with a short overall length comprising three lens components of four lenses, a first lens component being a cemented positive meniscus doublet lens consisting of a biconvex lens and biconcave lens, a second lens component being a positive lens, and a third lens component being a negative meniscus lens with its concave surface positioned on the object side, the focal length $f_4$ of said third lens component satisfying a condition $0.65f < -f_4 < 0.8f$ and at least the surface on the image side of said third lens component being arranged as an aspherical surface expressed by the following formula:

$$x = \frac{y^2}{r_7 + r_7 \sqrt{1 - \left(\frac{y}{r_7}\right)^2}} + By^4 + Cy^6 + Dy^8 + Ey^{10}$$

$$B > 0, C < 0$$

wherein reference symbol $r_7$ represents a radius of curvature of the surface on the image side of said third lens component at its portion near the optical axis, the advancing direction of ray on the optical axis is represented by $x$ axis and the direction perpendicular to said $x$ axis is represented by y axis.

2. A photographic lens system with a short overall length comprising three lens components of four lenses, a first lens being a cemented positive meniscus doublet lens consisting of a biconvex lens and a biconcave lens, a second lens component being a positive lens, and a third lens component being a negative meniscus lens with its concave surface positioned on the object side, said photographic lens system with a short overall length having numerical values as given below and the surface on the object side of said third lens component being an aspherical surface expressed by the formula given below:

$f=1, f_4=-0.689$

Aperture ratio  1 : 5.6
Field angle    ± 31°
Overall length 0.886

$r_1 = 0.2008$
$\quad d_1 = 0.076 \quad n_1 = 1.58267 \quad \nu_1 = 46.3$
$r_2 = -0.5814$
$\quad d_2 = 0.017 \quad n_2 = 1.83630 \quad \nu_2 = 30.4$
$r_3 = 0.4384$
$\quad d_3 = 0.097$
$r_4 = 2.7475$
$\quad d_4 = 0.038 \quad n_3 = 1.6668 \quad \nu_3 = 33.0$
$r_5 = -0.6844$
$\quad d_5 = 0.123$
$r_6 = -0.1366$
$\quad d_6 = 0.029 \quad n_4 = 1.60311 \quad \nu_4 = 60.7$
$r_7$ Aspherical surface $$x = \frac{y^2}{r_7 + r_7 \sqrt{1 - \left(\frac{y}{r_7}\right)^2}} + By^4 + Cy^6 + Dy^8 + Ey^{10}$$

$r_7 = -0.2199$, $B = 3.489$, $C = -1.056 \times 10^3$,
$D = 4.635 \times 10^4$, $E = -1.147 \times 10^6$ wherein reference symbols $r_1$ through $r_6$ respectively represent radii of curvature of respective lens surfaces, reference symbol $r_7$ represents radius of curvature of the surface on the image side of said third lens component at its portion near the optical axis, reference symbols $d_1$ through $d_6$ respectively represent thicknesses of respective lenses and airspaces between respective lenses, reference symbols $n_1$ through $n_4$ respectively represent refractive indexes of respective lenses, and reference symbols $\nu_1$ through $\nu_4$ respectively represent Abbe's numbers of respective lenses.

3. A photographic lens system with a short overall length comprising three lens components of four lenses, a first lens being a cemented positive meniscus doublet lens consisting of a biconvex lens and a biconcave lens, a second lens component being a positive meniscus lens, and a third lens component being a negative meniscus lens with its concave surface positioned on the object side, said photographic lens system with a short overall length having numerical values as given below and both surfaces of said third lens component being aspherical surfaces expressed by the formula given below:

$f = 1$, $\quad f_4 = -0.769$
Aperture ratio 1 : 4.5
Field angle $\pm 31°$
Overall length 0.899
$r_1 = 0.2121$
$\quad d_1 = 0.096 \quad n_1 = 1.58913 \quad \nu_1 = 61.1$
$r_2 = -0.5893$
$\quad d_2 = 0.018 \quad n_2 = 1.83400 \quad \nu_2 = 37.2$
$r_3 = 0.4568$
$\quad d_3 = 0.089$
$r_4 = 3.0754$ -continued
$\quad d_4 = 0.039 \quad n_3 = 1.66446 \quad \nu_3 = 35.8$
$r_5 = -0.7237$
$\quad d_5 = 0.116$
$r_6$ Aspherical surface
$\quad d_6 = 0.045 \quad n_4 = 1.491 \quad \nu_4 = 61.4$
$r_7$ Aspherical surface $$x = \frac{y^2}{r_6 + r_6 \sqrt{1 - \left(\frac{y}{r_6}\right)^2}} + By^4 + Cy^6 + Dy^8 + Ey^{10}$$

$r_6 = -0.1380$, $B = -2.213 \times 10^{-1}$, $C = -3.821 \times 10$,
$D = 2.381 \times 10^4$, $E = -3.017 \times 10^6$ $$x = \frac{y^2}{r_7 + r_7 \sqrt{1 - \left(\frac{y}{r_7}\right)^2}} + By^4 + Cy^6 + Dy^8 + Ey^{10}$$

$r_7 = -0.2408$, $B = 2.869$, $C = -7.279 \times 10^2$,
$D = 2.482 \times 10^4$, $E = -6.324 \times 10^5$ wherein reference symbols $r_1$ through $r_5$ respectively represent radii of curvature of respective lens surfaces, reference symbols $r_6$ and $r_7$ represent radii of curvature of both surfaces of said third lens component at its portion near the optical axis; reference symbols $d_1$ through $d_6$ respectively represent thicknesses of respective lenses and airspaces between respective lenses, reference symbols $n_1$ through $n_4$ respectively represent refractive indexes of respective lenses, and reference symbols $\nu_1$ through $\nu_4$ respectively represent Abbe's numbers of respective lenses.

* * * * *